(12) United States Patent
Watanabe et al.

(10) Patent No.: US 11,923,560 B2
(45) Date of Patent: Mar. 5, 2024

(54) SECONDARY BATTERY HAVING GREATER ADHESION BETWEEN ELECTRODE PLATE AND SEPARATOR CLOSER TO ELECTRODE TERMINAL AND METHOD OF MANUFACTURING THE SAME

(71) Applicant: Prime Planet Energy & Solutions, Inc., Tokyo (JP)

(72) Inventors: Daiki Watanabe, Himeji (JP); Yu Matsui, Kakogawa (JP); Akira Nishida, Himeji (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 222 days.

(21) Appl. No.: 17/364,893

(22) Filed: Jul. 1, 2021

(65) Prior Publication Data
US 2022/0029246 A1    Jan. 27, 2022

(30) Foreign Application Priority Data
Jul. 27, 2020   (JP) ................. 2020-126456

(51) Int. Cl.
*H01M 50/46* (2021.01)
*H01M 10/0525* (2010.01)

(52) U.S. Cl.
CPC ..... *H01M 50/461* (2021.01); *H01M 10/0525* (2013.01)

(58) Field of Classification Search
CPC ............ H01M 50/461; H01M 10/0525
(Continued)

(56) References Cited

U.S. PATENT DOCUMENTS

2012/0321932 A1   12/2012   Ise et al.
2014/0295170 A1*  10/2014   Kim ................... H01M 50/451
                                                        428/315.5
(Continued)

FOREIGN PATENT DOCUMENTS

CN   102742060 A   10/2012
CN   105703015 A    6/2016
(Continued)

OTHER PUBLICATIONS

"Vicinity." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1304130. (Year: 2010).*

*Primary Examiner* — Sean P Cullen
(74) *Attorney, Agent, or Firm* — HAUPTMAN HAM, LLP

(57) ABSTRACT

A secondary battery includes: an electrode plate including a main body portion and an electrode terminal portion protruding from the main body portion along a first direction; and a separator adhered to the electrode plate, wherein the main body portion of the electrode plate includes a central region located in a vicinity of a center in the first direction, a first region located on a side close to the electrode terminal portion with respect to the central region in the first direction, and a second region located on a side opposite to the first region with respect to the central region in the first direction, and adhesion strength per unit area between the electrode plate and the separator in the first region is higher than adhesion strength per unit area between the electrode plate and the separator in the second region.

20 Claims, 6 Drawing Sheets

(58) Field of Classification Search
USPC ................................. 429/144, 246, 251, 254
See application file for complete search history.

(56) References Cited

U.S. PATENT DOCUMENTS

| | | |
|---|---|---|
| 2015/0311490 A1 | 10/2015 | Murase et al. |
| 2018/0323415 A1* | 11/2018 | Lee ...................... H01M 50/46 |
| 2019/0221808 A1 | 7/2019 | Honda et al. |
| 2020/0313186 A1 | 10/2020 | Wang et al. |

FOREIGN PATENT DOCUMENTS

| | | | | |
|---|---|---|---|---|
| CN | 108417886 A | | 8/2018 | |
| CN | 109792089 A | | 5/2019 | |
| CN | 109980177 A | | 7/2019 | |
| CN | 209912980 U | | 1/2020 | |
| JP | 2014-038801 A | | 2/2014 | |
| JP | 2014110160 A | | 6/2014 | |
| JP | 2014120456 A | * | 6/2014 | |
| JP | 201798203 A | | 6/2017 | |
| JP | 201856142 A | | 4/2018 | |
| KR | 10-2016-0016174 A | | 2/2016 | |
| WO | WO-2019077664 A1 | * | 4/2019 | ............... H01B 1/06 |
| WO | 2021131918 A1 | | 7/2021 | |

\* cited by examiner

SECONDARY BATTERY HAVING GREATER ADHESION BETWEEN ELECTRODE PLATE AND SEPARATOR CLOSER TO ELECTRODE TERMINAL AND METHOD OF MANUFACTURING THE SAME

This nonprovisional application is based on Japanese Patent Application No. 2020-126456 filed on Jul. 27, 2020, with the Japan Patent Office, the entire contents of which are hereby incorporated by reference.

BACKGROUND OF THE INVENTION

Field of the Invention

The present disclosure relates to a secondary battery and a method of manufacturing the secondary battery.

Description of the Background Art

As described in Japanese Patent Laying-Open No. 2018-56142 (PTL 1), as a structure of an electrode assembly of a secondary battery such as a lithium ion battery, there has been known a structure in which electrode plates and a separator having an adhesive layer are stacked and are thermally compressed.

When the stack of the electrode plates and the separator is thermally compressed by thermally pressing the stack from above and below, heat is more likely to be dissipated at an outer peripheral portion of the stack than that at the central portion of the stack. Hence, adhesive force between each electrode plate and the separator at the outer peripheral portion tends to be lower than that at the central portion. When the adhesive force between each electrode plate and the separator is decreased, the electrode plate and the separator may be detached from each other in an unintended state. As a result, a distance between the electrode plates is increased to cause increased resistance, with the result that output performance of the battery may be decreased. Particularly, since current is concentrated at a portion such as a vicinity of an electrode terminal, the portion is affected more greatly by the above-described detachment than the other portions.

SUMMARY OF THE INVENTION

An object of the present disclosure is to provide a secondary battery and a method of manufacturing the secondary battery so as to improve adhesive strength between an electrode plate and a separator in the vicinity of an electrode terminal.

A secondary battery according to the present disclosure includes: an electrode plate including a main body portion and an electrode terminal portion protruding from the main body portion along a first direction; and a separator adhered to the electrode plate, wherein the main body portion of the electrode plate includes a central region located in a vicinity of a center in the first direction, a first region located on a side close to the electrode terminal portion with respect to the central region in the first direction, and a second region located on a side opposite to the first region with respect to the central region in the first direction, and adhesion strength per unit area between the electrode plate and the separator in the first region is higher than adhesion strength per unit area between the electrode plate and the separator in the second region.

A method of manufacturing a secondary battery according to the present disclosure includes: stacking an electrode plate and a separator on each other, the electrode plate including a main body portion and an electrode terminal portion protruding from the main body portion along a first direction; and thermally adhering the electrode plate and the separator stacked on each other, wherein the main body portion of the electrode plate includes a central region located in a vicinity of a center in the first direction, a first region located on a side close to the electrode terminal portion with respect to the central region in the first direction, and a second region located on a side opposite to the first region with respect to the central region in the first direction, and in the thermally adhering, an amount of heat applied to the first region per unit area is larger than an amount of heat applied to the second region per unit area.

According to the present disclosure, adhesive strength can be improved between the electrode plate and the separator in the vicinity of the electrode terminal of the secondary battery, thereby suppressing decrease of output performance of the battery.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
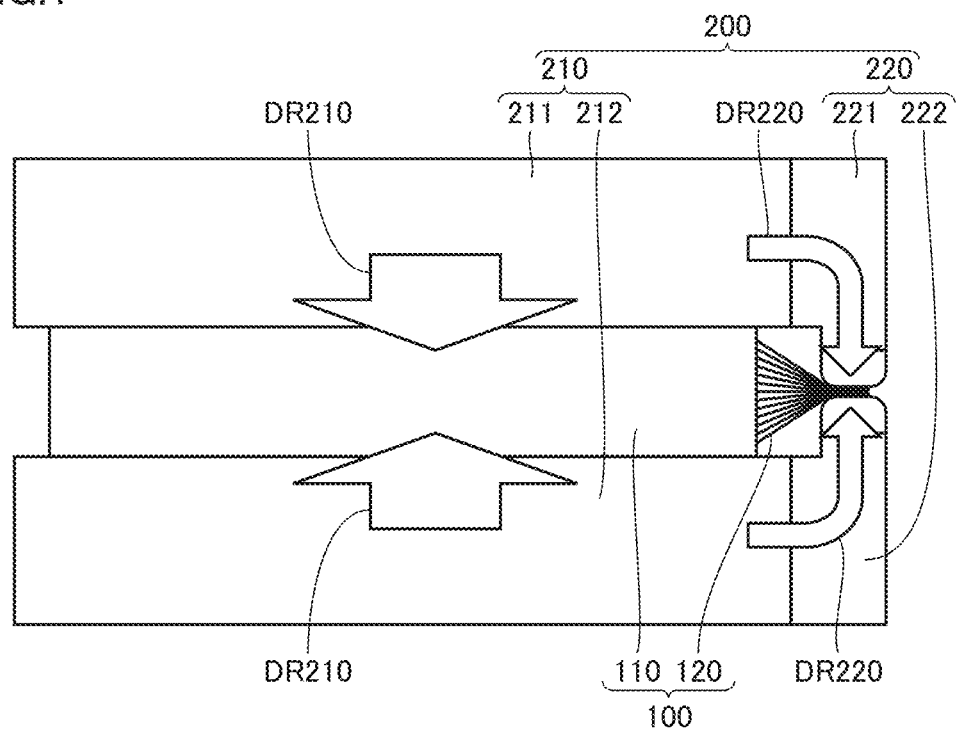
FIG. 1 is a diagram showing a thermal adhesion step in a method of manufacturing a secondary battery according to one embodiment of the present disclosure.

Hereinafter, embodiments of the present disclosure will be described. It should be noted that the same or corresponding portions are denoted by the same reference characters and may not be described repeatedly.

It should be noted that in the embodiments described below, when reference is made to number, amount, and the like, the scope of the present disclosure is not necessarily limited to the number, amount, and the like unless otherwise stated particularly. In the embodiments described below, each component is not necessarily essential to the present disclosure unless otherwise stated particularly.

A secondary battery according to the present embodiment is a lithium ion battery, but the scope of the present disclosure is not limited thereto and can include other secondary batteries such as a nickel-metal hydride battery.

FIG. 1 is a diagram showing a thermal adhesion step in a method of manufacturing the secondary battery according to the present embodiment. The secondary battery according to the present embodiment includes an electrode assembly 100. The secondary battery is formed by accommodating electrode assembly 100 in an accommodation case (not shown) together with an electrolyte solution.

Electrode assembly 100 is manufactured in the following manner: positive electrode plates, negative electrode plates, and a separator to be interposed between the positive electrode plates and the negative electrode plates, are stacked; and the stack is pressed while heating the stack to thermally adhere the electrode plates to the separator. Electrode assembly 100 includes a main body portion 110 and an electrode terminal portion 120. As shown in FIG. 1, electrode assembly 100 is pressed while being heated by a heating plate 200. In the example of FIG. 1, heating plate 200 is heated to have a substantially uniform temperature.

Heating plate 200 includes a main body 210 and a terminal heating portion 220. Main body 210 includes a first portion 211 and a second portion 212, and main body portion 110 of electrode assembly 100 is pressed by first portion 211 and second portion 212. Terminal heating portion 220 includes a first portion 221 and a second portion 222, and electrode terminal portion 120 of electrode assembly 100 is pressed by first portion 221 and second portion 222.

When heating plate 200 presses electrode assembly 100, heat is applied from main body 210 of heating plate 200 toward main body portion 110 of electrode assembly 100 along arrows DR210. Further, heat is applied from terminal heating portion 220 of heating plate 200 toward electrode terminal portion 120 of electrode assembly 100 along arrows DR220.

Figure 2:
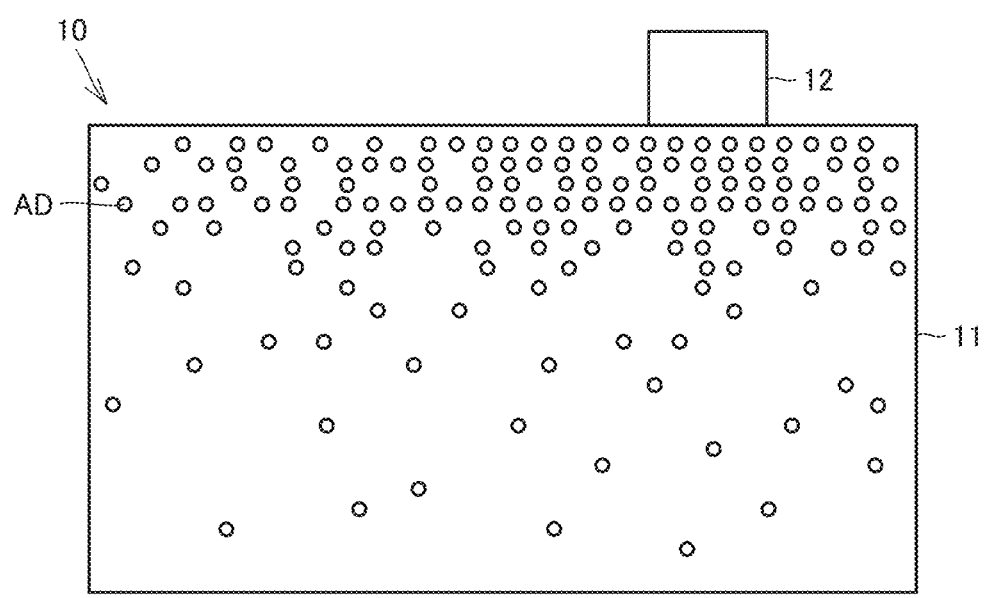
FIG. 2 is a diagram showing a distribution of adhesion portions formed by the thermal adhesion step shown in FIG. 1.

FIG. 2 is a diagram showing a distribution of adhesion portions AD formed by the thermal adhesion step shown in FIG. 1. As shown in FIG. 2, electrode plate 10 includes: a main body portion 11 having a quadrangular shape; and an electrode tab 12 (electrode terminal portion) protruding from main body portion 11. Electrode tab 12 is formed to protrude from main body portion 11 toward the upper side in FIG. 2.

When electrode plate 10 and the separator are stacked, main body portion 11 constitutes main body portion 110 of electrode assembly 100, and electrode tab 12 constitutes electrode terminal portion 120 of electrode assembly 100.

Dot-shaped adhesion portions AD are formed at main body portion 110. Each of adhesion portions AD is a portion that exhibits adhesive force between electrode plate 10 and the separator. As shown in FIG. 2, adhesion portions AD are formed at a relatively high density on a side close to electrode tab 12. That is, a relatively high adhesive strength is obtained on the side close to electrode tab 12.

Figure 3:
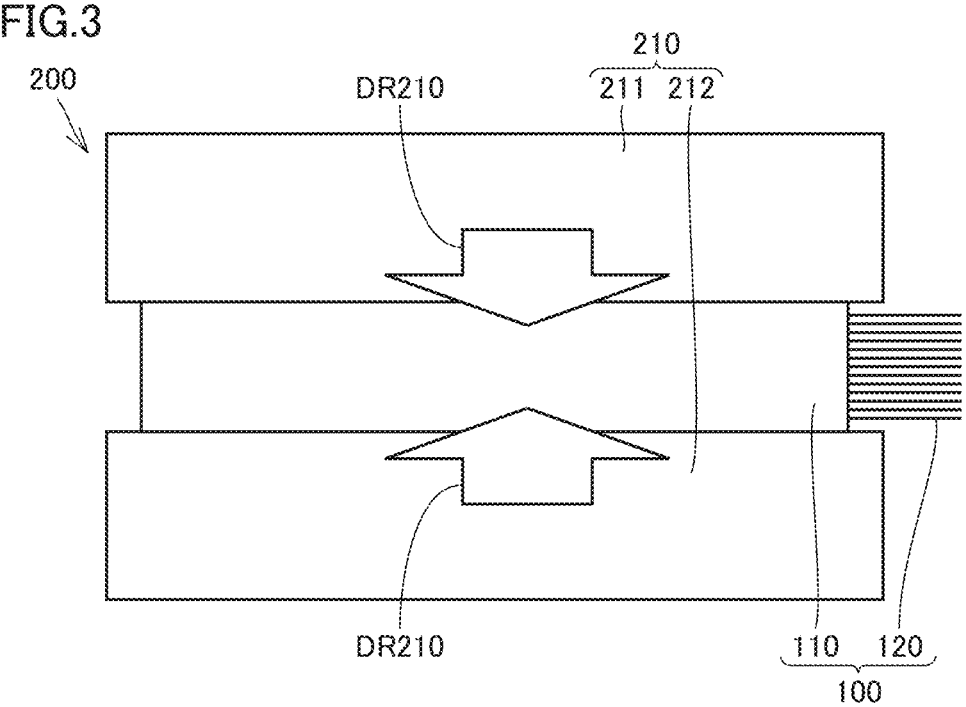
FIG. 3 is a diagram showing a thermal adhesion step according to a comparative example.

FIG. 3 is a diagram showing a thermal adhesion step according to a comparative example. In the comparative example shown in FIG. 3, terminal heating portion 220 shown in FIG. 1 is not provided. Heat is applied from main body 210 of heating plate 200 to main body portion 110 of electrode assembly 100 along arrows DR210, with the result that an adhesion portion is formed between the electrode plate and the separator but electrode terminal portion 120 is not directly heated. Also in the example of FIG. 3, heating plate 200 is heated to have a substantially uniform temperature.

Figure 4:
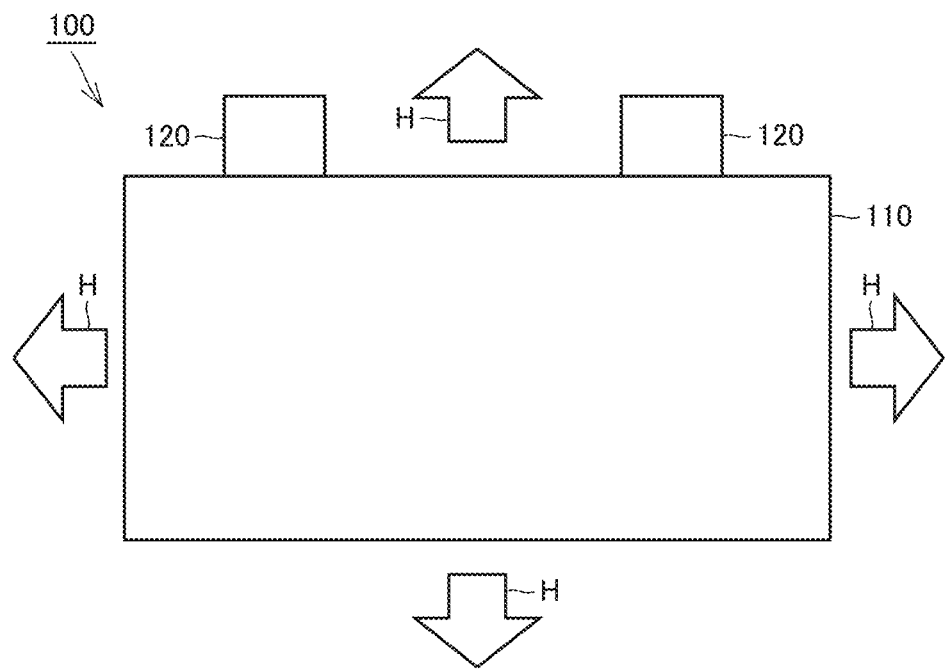
FIG. 4 is a diagram for illustrating heat dissipation from an electrode plate in the thermal adhesion step.

Next, heat dissipation from electrode assembly 100 during the thermal adhesion step will be described with reference to FIG. 4. As shown in FIG. 4, in the thermal adhesion step, heat is dissipated from the outer peripheral portion of main body portion 110 of electrode assembly 100 in directions of arrows H. Since heat is thus more likely to be dissipated at the outer peripheral portion of main body portion 110 than that at the central portion of main body portion 110, a temperature during the thermal adhesion is relatively decreased thereat, with the result that adhesive force between each electrode plate and the separator at the outer peripheral portion of main body portion 110 is likely to be lower than that at the central portion of main body portion 110. When the adhesive force between the electrode plate and the separator is decreased, the electrode plate and the separator may be detached from each other in an unintended state.

Each of electrode plates 10 is formed by forming an active material layer on a core member. At an upper edge end portion of electrode plate 10 (upper edge end portion in FIG. 4), the thickness of the active material layer tends to be relatively thin. Therefore, when electrode plates 10 are stacked, a distance between electrode plates 10 is large and heat resistance is large in the vicinity of electrode tab 12 as compared with the lower edge end portion thereof (lower edge end portion in FIG. 4). As a result, sufficient adhesive strength is unlikely to be obtained, with the result that the above-described unintended detachment tends to be likely to occur.

As a result, at the outer peripheral portion of main body portion 110 of electrode assembly 100, a distance between electrode plates 10 is increased to cause increased resistance. Therefore, output performance of the battery is decreased. In particular, current is concentrated in the vicinity of electrode terminal portion 120 during operation of the battery, the vicinity of electrode terminal portion 120 is affected more greatly than the other portions. Therefore, it is important to improve adhesive strength between each electrode plate 10 and the separator in the vicinity of electrode terminal portion 120 to stabilize the distance between electrode plates 10.

In the present embodiment, by providing terminal heating portion 220 in heating plate 200 as shown in FIG. 1, heat is input to electrode assembly 100 not only in the directions of arrows DR210 but also in the directions of arrows DR220. Thus, electrode plate 10 and the separator can be thermally adhered to each other in such a state that a larger amount of heat per unit area is applied in a "first region" than that in a "second region", the "first region" being a region located on the side close to electrode terminal portion 120 (the right side in FIG. 1 and the upper side in each of FIGS. 2 and 4), the "second region" being a region located on a side distant away from electrode terminal portion 120 (the left side in FIG. 1 and the lower side in each of FIGS. 2 and 4).

That is, in the present embodiment, the thermal adhesion step of thermally adhering electrode plate 10 and the separator includes heating the "first region" on the side close to electrode terminal portion 120 of electrode assembly 100 at a temperature higher than the temperature of heating the "second region" on the side opposite thereto. Since electrode terminal portion 120 is heated by terminal heating portion 220, the electrode terminal portion 120 side is heated at a relatively high temperature.

Accordingly, main body portion 110 located in the vicinity of electrode terminal portion 120 can be heated at a relatively high temperature without performing an additional step, thus resulting in increased adhesive strength between electrode plate 10 and the separator at that portion. Therefore, adhesive strength in the vicinity of electrode terminal portion 120 can be improved without decreasing productivity.

The scope of the present disclosure is not limited to the example described above. For example, the "first region" of main body portion 110 does not necessarily need to be heated at a temperature higher than the temperature of heating the "second region". For example, even when the "first region" and the "second region" are heated at the same temperature, an amount of heat applied to the "first region" may be made larger than an amount of heat applied to the "second region" by heating the "first region" for a relatively longer period of time than a period of time for heating the "second region".

Further, electrode terminal portion 120 does not necessarily need to be heated by terminal heating portion 220. For example, an additional amount of heat may be applied to the side close to electrode terminal portion 120 by applying hot air to electrode terminal portion 120 during the thermal adhesion step.

Figure 5:
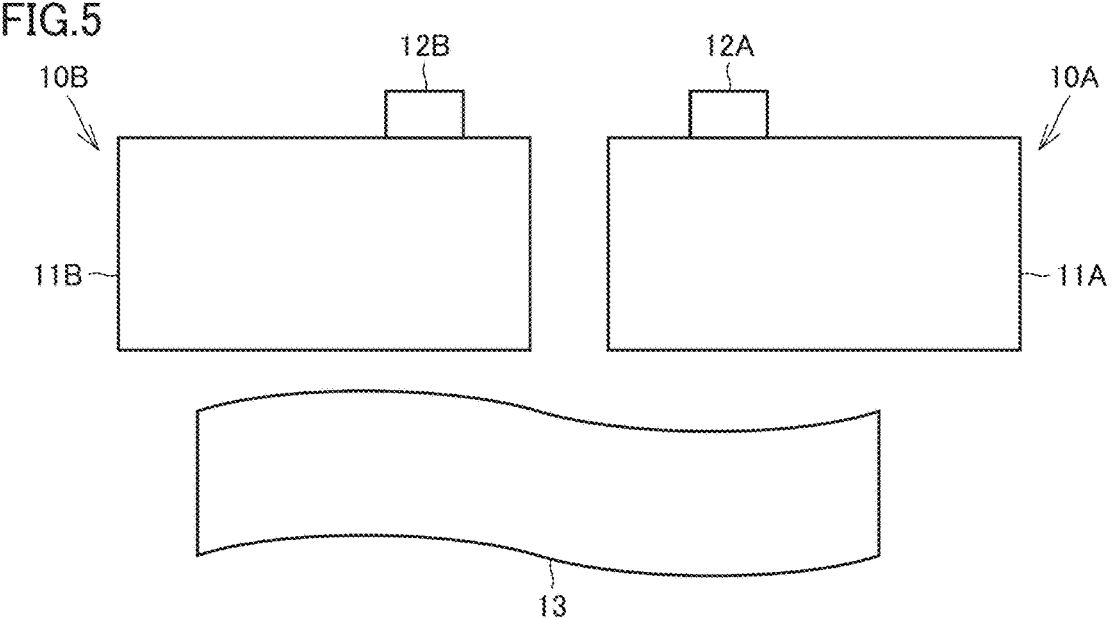
FIG. 5 is a diagram showing components of an electrode assembly of the secondary battery according to the one embodiment of the present disclosure.
Figure 6:
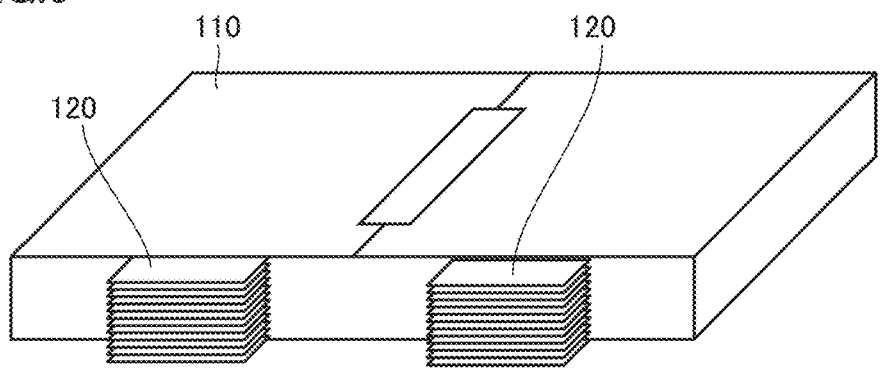
FIG. 6 is a diagram showing the electrode assembly formed using the components shown in FIG. 5.
Figure 7:
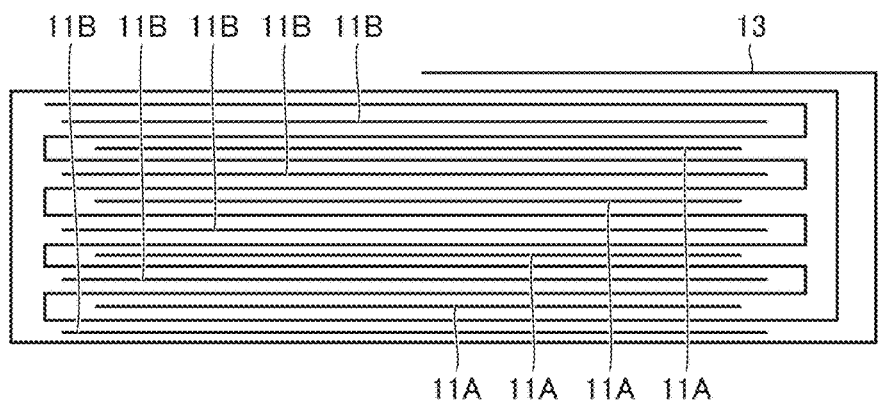
FIG. 7 is a diagram showing arrangements of a positive electrode plate, a negative electrode plate, and a separator in the electrode assembly shown in FIG. 6.

Next, a structure of electrode assembly 100 will be described in detail with reference to FIGS. 5 to 7. FIG. 5 is a diagram showing components of electrode assembly 100. FIG. 6 is a diagram showing electrode assembly 100 formed using the components shown in FIG. 5. FIG. 7 is a diagram showing arrangements of the electrode plates and the separator in electrode assembly 100.

As shown in FIGS. 5 to 7, electrode assembly 100 is formed by stacking the plurality of electrode plates 10 and separator 13. The plurality of electrode plates 10 include positive electrode plates 10A and negative electrode plates 10B. Positive electrode plates 10A and negative electrode plates 10B are alternately stacked with separator 13 being interposed therebetween. Each of positive electrode plates 10A has a main body portion 11A and an electrode tab 12A, and each of negative electrode plates 10B has a main body portion 11B and an electrode tab 12B.

As an example, positive electrode plate 10A is formed by providing positive electrode composite layers on both surfaces of a core member composed of an aluminum foil having a thickness of 13 µm. Each of the positive electrode composite layers on each surface has a thickness of 62 µm after a compression process. The positive electrode composite layer includes $LiNiCoMnO_2$ (positive electrode active material), acetylene black (electrically conductive material), and PVDF (polyvinylidene difluoride resin) (binder) in a mass ratio of 97:2:1. The width of main body portion 11A of positive electrode plate 10A in the short side direction is 76.5 mm, and the width of main body portion 11A of positive electrode plate 10A in the long side direction is 138.9 mm. A protruding amount of electrode tab 12A is 19.6 mm.

As an example, negative electrode plate 10B is formed by providing negative electrode composite layers on both surfaces of a core member composed of a copper foil having a thickness of 8 µm. Each of the negative electrode composite layers on each surface has a thickness of 76 µm after the compression process. The negative electrode composite layer includes graphite (negative electrode active material), CMC [carboxymethyl cellulose] (thickener), and SBR [styrene-butadiene copolymer] (binder) in a mass ratio of 98:1:1. The width of main body portion 11B of negative electrode plate 10B in the short side direction is 78.2 mm, and the width of main body portion 11B of negative electrode plate 10B in the long side direction is 142.8 mm. A protruding amount of electrode tab 12B is 18.2 mm.

As an example, separator 13 is a member shaped to have a long length. In separator 13, one surface of a polyethylene single-layer substrate is coated with a ceramic heat-resistant layer, and adhesive layers each composed of an acryl-based resin are applied on the both sides thereof in the form of dots. Respective amounts of adhesive agent in the dots are substantially the same. The density of the dots in number is substantially constant on one side surface of the separator. The thickness of the substrate layer in separator 13 is 12 µm, and the thickness of the heat-resistant layer is 4 µm. The width of separator 13 is 80.7 mm.

Electrode assembly 100 as an example is manufactured using positive electrode plates 10A, negative electrode plates 10B, and separator 13 according to the above-described example. Positive electrode plates 10A and negative electrode plates 10B are alternately stacked with separator 13 being interposed therebetween while avoiding electrode tabs 12A, 12B of positive electrode plates 10A and negative electrode plates 10B from overlapping with each other. In this way, electrode assembly 100 serving as a stack is manufactured. The number of stacked positive electrode plates 10A is 35, and the number of stacked negative electrode plates 10B is 36. Electrode assembly 100 is heat-pressed using heating plate 200 heated to a setting temperature of 115° C. On this occasion, a pressure of 2 MPa is applied continuously for 57 seconds from each of both sides of electrode assembly 100.

Next, the following describes an exemplary method of measuring the adhesive strength as well as exemplary results of the measurement using the measurement method. Here, electrode assembly 100 according to the above-described example is a target for the measurement, and explanation will be made as to a measurement result in the "example of the present disclosure" (see FIG. 1) representing a case where heating by terminal heating portion 220 is performed and a measurement result in the "comparative example" (see FIG. 3) in which heating by terminal heating portion 220 is not performed (the other conditions are the same).

Figure 8:
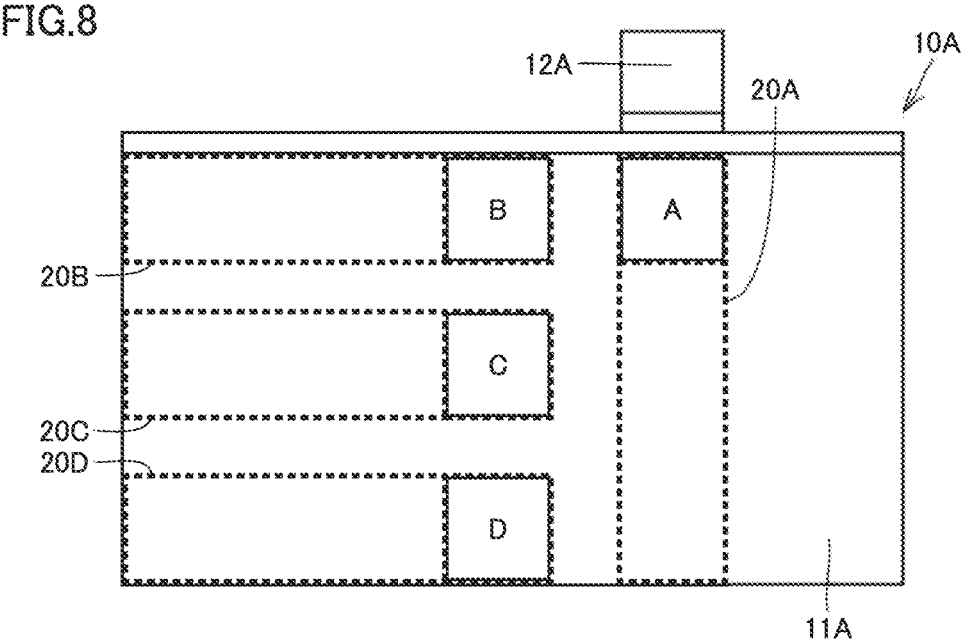
FIG. 8 is a diagram showing arrangements of cutout regions and measurement regions for measuring adhesive strength between each electrode plate and the separator.
Figure 9:
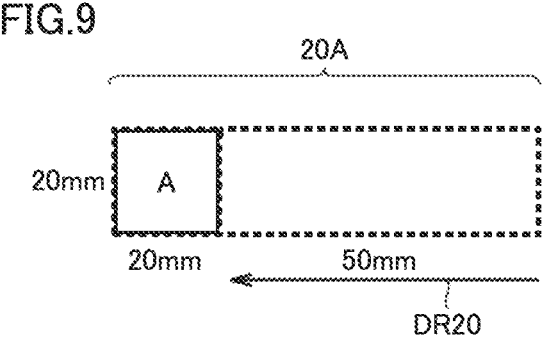
FIG. 9 is a diagram for illustrating shapes of each cutout region and each measurement region shown in FIG. 8 more in detail.
Figure 10:
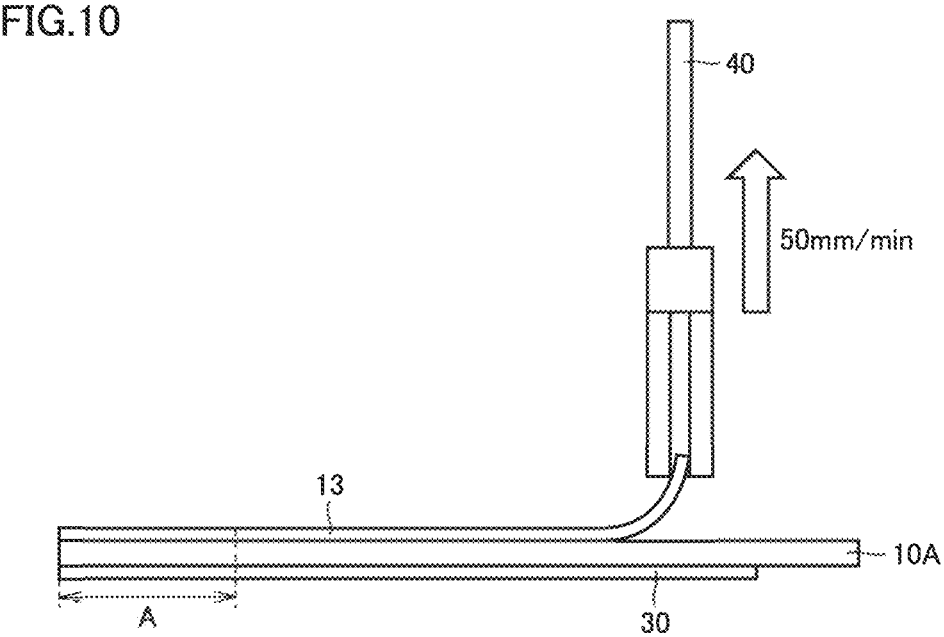
FIG. 10 is a diagram showing a step of measuring the adhesive strength between the electrode plate and the separator in each of the cutout region and the measurement region shown in FIG. 8.

FIG. 8 is a diagram showing arrangements of cutout regions and measurement regions for measuring the adhesive strength. FIG. 9 is a diagram showing a cutout region 20A more in detail. FIG. 10 is a diagram showing a step of measuring the adhesive strength between positive electrode plate 10A and separator 13.

As shown in FIG. 8, cutout regions 20A to 20D include measurement regions A to D, respectively. Measurement regions A, B, D are located at the outer peripheral portion of main body portion 11A of positive electrode plate 10A. Among them, measurement region A is located immediately below electrode tab 12A, and measurement regions B, D are located at the central portion of main body portion 11A in the long side direction (leftward/rightward direction in FIG. 8). Each of measurement regions A, B is the "first region" located on the side close to electrode tab 12A of main body portion 11A. Measurement region D is the "second region" located on the side opposite to electrode tab 12A of main body portion 11A. Measurement region C is a "central region" located in the vicinity of the center of main body portion 11A in the short side direction (first direction: upward/downward direction in FIG. 8) and the long side direction (second direction: leftward/rightward direction in FIG. 8).

First, positive electrode plate 10A located at the center in the thickness direction (the 18th positive electrode plate 10A of 35 positive electrode plates 10A) is removed from electrode assembly 100 having been through the heat pressing, and cutout regions 20A to 20D shown in FIGS. 8 and 9 are cut out as samples (20 mm×70 mm).

Next, as shown in FIG. 10, a double-faced tape 30 (NW-20 manufactured by Nichiban) is adhered to one positive electrode composite layer of the sample of positive electrode plate 10A to fix it to a smooth plastic substrate. Next, one end portion of separator 13 in the long side direction of the sample is fixed to a movable jig 40 of a digital force gauge (FGP-5 manufactured by Nidec-Shimpo) such that separator 13 can be detached in a direction of arrow DR20 in FIG. 9 by pulling separator 13 in a direction of 90° with respect to the substrate surface. Then, movable jig 40 is moved to detach the positive electrode composite layer of the sample (specimen) and the separator from each other at a rate of 50 mm/minute. The pulling direction is always maintained in the direction of 90° with respect to the substrate surface of the plastic substrate to which the sample (specimen) is fixed.

For example, in the case of the measurement of cutout region 20A, the average value of forces applied to the digital force gauge and measured at intervals of 0.1 mm during detachment in measurement region A (20 mm×20 mm) shown in FIG. 9 is defined as detachment strength (peeling strength) between the positive electrode composite layer and the separator. The same applies to cutout regions 20B to 20D. The detachment strength (peeling strength) corresponds to "adhesion strength per unit area" between electrode plate 10 and separator 13 at that portion.

Figure 11:
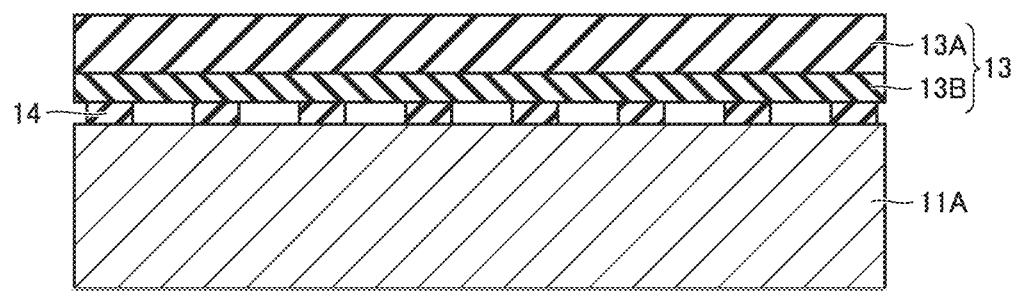
FIG. 11 is a cross sectional view showing a state in which the separator is adhered to the electrode plate.
Figure 12:
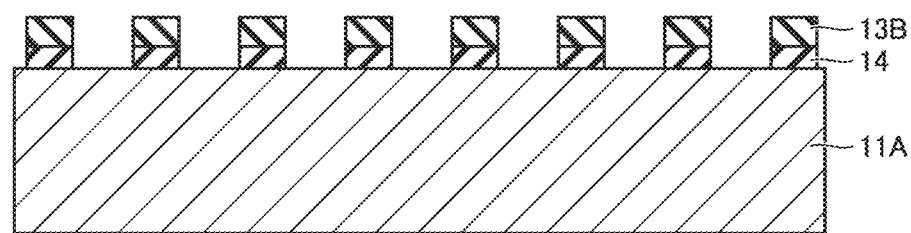
FIG. 12 is a cross sectional view showing an adhesion trace when the separator is detached from the state shown in FIG. 11.

Next, an adhesion trace between electrode plate 10 and separator 13 will be described with reference to FIGS. 11 and 12. FIG. 11 is a cross sectional view showing a state in which separator 13 is adhered to positive electrode plate 10A. FIG. 12 is a cross sectional view showing a state in which separator 13 is detached from the state shown in FIG. 11.

As shown in FIG. 11, main body portion 11A of positive electrode plate 10A is adhered to separator 13 through an adhesive agent 14. Separator 13 includes a substrate 13A and a heat-resistant layer 13B. Heat-resistant layer 13B and main body portion 11A of positive electrode plate 10A are adhered to each other through adhesive agent 14.

Substrate 13A and heat-resistant layer 13B of separator 13 are adhered to each other with a relatively weak force of about 5 to 7 N/m. Therefore, when a detachment test (peeling test) is performed in accordance with the method shown in FIG. 10, adhesive agent 14 is not detached from positive electrode plate 10A and heat-resistant layer 13B, and heat-resistant layer 13B is detached from substrate 13A. That is, when detaching separator 13, heat-resistant layer 13B remains as a "transfer trace" together with adhesive agent 14 on positive electrode plate 10A due to the weak adhesive strength between substrate 13A and heat-resistant layer 13B of separator 13. As a result, the adhesion portion is transferred as being white on the surface of positive electrode plate 10A. By binarizing an image of the surface captured with a camera, a scanner, or the like, an adhesion trace density=[(white area)/(black area)] can be calculated as a "ratio of area occupied by the transfer trace".

Figure 13:
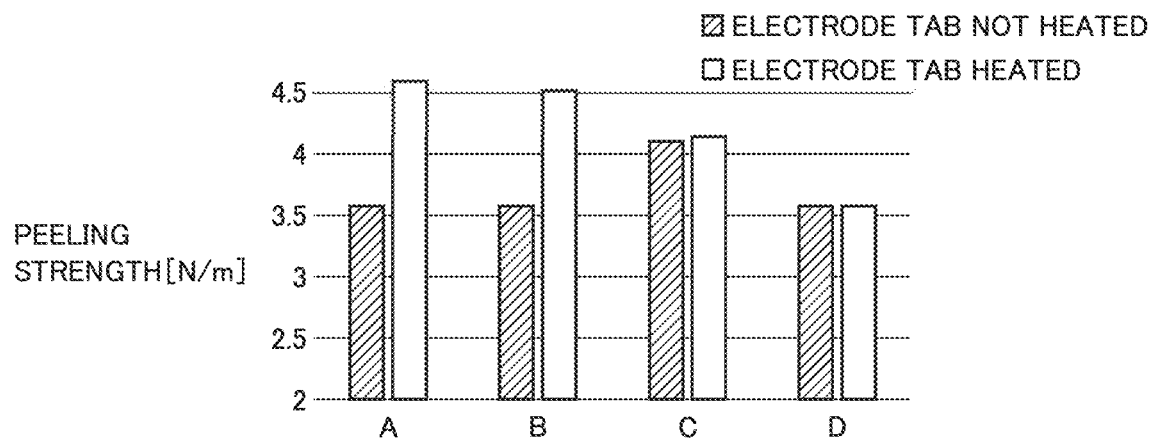
FIG. 13 is a diagram showing measurement results (peeling strengths) in measurement regions A to D shown in FIG. 8.
Figure 14:
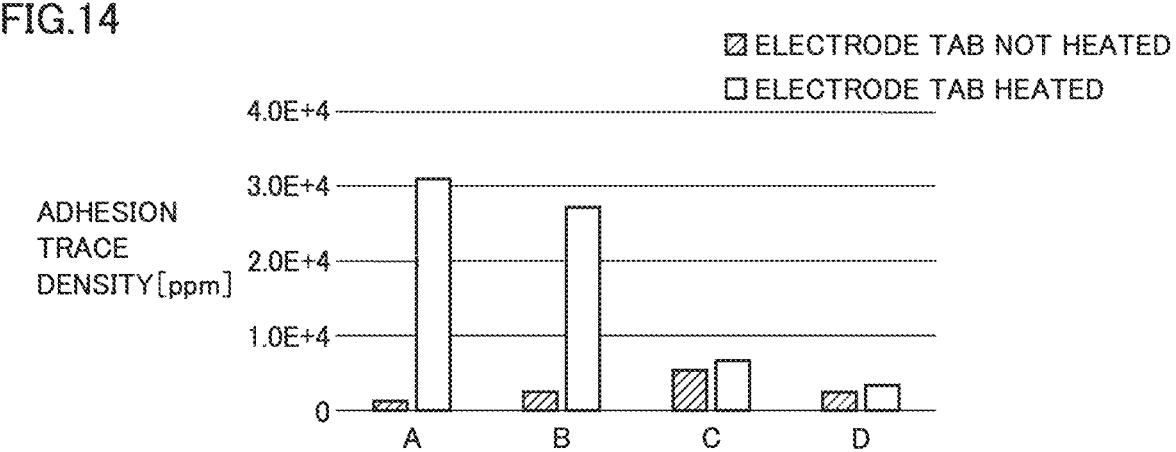
FIG. 14 is a diagram showing measurement results (adhesion trace densities) in measurement regions A to D shown in FIG. 8.

FIG. 13 is a diagram showing measurement results of peeling strengths (detachment strengths) in measurement regions A to D shown in FIG. 8. FIG. 14 is a diagram showing measurement results of adhesion trace densities in measurement regions A to D. The measurement results shown in FIGS. 13 and 14 are obtained by measuring the peeling strengths (detachment strengths) and the adhesion trace densities in measurement regions A to D shown in FIG. 8 under the above-described specific condition.

In each of FIGS. 13 and 14, the indication "ELECTRODE TAB HEATED" (example of the present disclosure) represents each measurement result when main body portion 110 and electrode terminal portion 120 of electrode assembly 100 are heat-pressed as shown in FIG. 1, and the indication "ELECTRODE TAB NOT HEATED" (comparative example) represents each measurement result when only main body portion 110 of electrode assembly 100 is heat-pressed as shown in FIG. 3.

As shown in FIG. 13, in the case of "ELECTRODE TAB NOT HEATED" according to the comparative example, the peeling strengths of measurement regions A, B, D located at the outer peripheral portion of main body portion 11A in positive electrode plate 10A (A: 3.60; B: 3.61; D: 3.61 [N/m]) are substantially the same, whereas the peeling strength of measurement region C located in the vicinity of the center of main body portion 11A (4.13 [N/m]) is higher than the peeling strengths of measurement regions A, B, D.

In the case of "ELECTRODE TAB HEATED" according to the example of the present disclosure, the peeling strengths of measurement regions A, B located on the side close to electrode tab 12A (upper side in FIG. 8) (A: 4.60; B: 4.54 [N/m]) are increased. The peeling strengths of measurement regions C, D (C: 4.16; D: 3.60 [N/m]) are substantially the same as those in the case of "ELECTRODE TAB NOT HEATED". As a result, the peeling strengths of measurement regions A, B located on the electrode tab 12A side are higher than the peeling strengths of measurement regions C, D.

In order to realize stable adhesion on the side close to electrode tab 12A, each of the peeling strengths of measurement regions A, B is preferably more than or equal to the peeling strength of measurement region C, that is, more than or equal to about 4.2 [N/m] when measured in accordance with the above-described measurement method.

As shown in FIG. 14, in the case of "ELECTRODE TAB NOT HEATED" according to the comparative example, the adhesion trace densities of measurement regions A, B, D located at the outer peripheral portion of main body portion 11A in positive electrode plate 10A (A: 1.49; B: 2.9; D: 2.9 [ppm×$10^3$]) are substantially the same or the adhesion trace density of measurement region A is slightly lower, whereas the adhesion trace density of measurement region C located in the vicinity of the center of main body portion 11A (5.7 [ppm×$10^3$]) is higher than the adhesion trace densities of measurement regions A, B, D.

In the case of "ELECTRODE TAB HEATED" according to the example, the adhesion trace densities of measurement regions A, B located on the electrode tab 12A side (upper side in FIG. 8) (A: 30.9; B: 27.4 [ppm×$10^3$]) are greatly increased. The adhesion trace densities in measurement regions C, D (C: 7.3; D: 3.9 [ppm×10³]) are not greatly different from those in the case of "ELECTRODE TAB NOT HEATED". As a result, the adhesion trace densities of measurement regions A, B located on the electrode tab 12A side are higher than the adhesion trace densities of measurement regions C, D.

In order to realize stable adhesion on the side close to electrode tab 12A, each of the adhesion trace densities of measurement regions A, B is preferably more than or equal to the adhesion trace density of measurement region C, that is, more than or equal to $1.0 \times 10^4$ [ppm].

As described above, in electrode assembly 100, the adhesion strength per unit area between positive electrode plate 10A and separator 13 in each of measurement regions A, B (first region) located on the side close to electrode tab 12A is higher than the adhesion strength per unit area between positive electrode plate 10A and separator 13 in measurement region D (second region) located opposite to measurement regions A, B with respect to measurement region C (central region). This is presumably due to the following reason: the amount of heat applied to each of measurement regions A, B per unit area is larger than the amount of heat applied to measurement region D per unit area in the thermal adhesion step of thermally adhering the electrode plate and the separator. The above is realized in the same manner in at least part, preferably a whole, of positive electrode plates 10A and negative electrode plates 10B included in electrode assembly 100.

It should be noted that the scope of the present disclosure is not limited to the structure in which the adhesive layer (adhesive agent 14) is formed in the form of dots on the surface of separator 13, and the present disclosure includes: a structure in which the adhesive layer is formed on the entire surface of the separator; a structure in which the separator itself has adhesiveness; a structure in which adhesive layers are formed on the surfaces of the positive electrode plate and the negative electrode plate; and the like. That is, any structure can be employed as long as the adhesive layer exists between the separator and the electrode plate (inclusive of the case where the adhesive layer exists in the separator itself).

Further, in the present disclosure, the material and shape of the adhesive layer are not particularly limited, and a known material can be appropriately selected and used. The adhesive layer may be an adhesive layer in which a plurality of particles each having adhesiveness are gathered. The adhesive layer may be weldable, or may be softened by heating to enter irregularities of the surface of the electrode plate or the separator so as to adhere the electrode plate and the separator.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A secondary battery, comprising:
   an electrode plate including
      a main body portion, and
      an electrode terminal portion protruding from the main body portion along a first direction; and
   a separator adhered to the electrode plate, wherein
   the main body portion of the electrode plate includes
      a central region including a center position of the main body portion in the first direction,
      a first region closer to the electrode terminal portion than the central region in the first direction, and
      a second region located on a side opposite to the first region with respect to the central region in the first direction,
   adhesion strength per unit area between the electrode plate and the separator in the first region is higher than adhesion strength per unit area between the electrode plate and the separator in the second region,
   the central region is defined by
      two peripheral edges of the main body portion opposite to each other in a second direction crossing the first direction,
      a first boundary separating the central region from the first region and extending in the second direction between the two peripheral edges, and
      a second boundary separating the central region from the second region and extending in the second direction between the two peripheral edges,
   the first region is defined by
      the two peripheral edges,
      a first edge connecting the two peripheral edges, and
      the first boundary, and
   the second region is defined by
      the two peripheral edges,
      a second edge opposite to the first edge and connecting the two peripheral edges, and
      the second boundary.

2. The secondary battery according to claim 1, wherein the adhesive strength per unit area between the electrode plate and the separator in the first region is more than or equal to adhesive strength per unit area between the electrode plate and the separator in the central region.

3. The secondary battery according to claim 1, wherein the adhesive strength between the electrode plate and the separator in the first region when the separator having a width of 20 mm is detached from the electrode plate at a rate of 50 mm/minute is more than or equal to 4.2 N/m.

4. The secondary battery according to claim 1, wherein an adhesion trace density in the first region when the separator is detached from the electrode plate is more than or equal to $1.0 \times 10^4$ ppm.

5. The secondary battery according to claim 1, wherein the electrode plate has a first thickness in the first region, the electrode plate has a second thickness in the second region, and the first thickness is thinner than the second thickness.

6. The secondary battery according to claim 1, wherein the secondary battery comprises a plurality of electrode plates including the electrode plate, the plurality of electrode plates includes a positive electrode plate and a negative electrode plate, and the positive electrode plate and the negative electrode plate are alternately stacked with the separator being interposed between the positive electrode plate and the negative electrode plate.

7. The secondary battery according to claim 1, wherein a positive electrode active material of the secondary battery includes lithium.

8. The secondary battery according to claim 1, wherein the electrode plate and the separator are adhered to each other in each of the first region and the second region.

9. The secondary battery according to claim 1, wherein the first region is located at an end portion of the electrode plate in the first direction.

10. The secondary battery according to claim 1, wherein the central region is a region of 20 mm×20 mm including the center position of the main body portion in the first direction.

11. The secondary battery according to claim 1, further comprising:
a plurality of adhesion portions adhering the electrode plate and the separator, wherein a number of adhesion portions of the plurality of adhesion portions in the first region is more than a number of adhesion portions of the plurality of adhesion portions in the second region.

12. The secondary battery according to claim 1, further comprising:
a plurality of adhesion portions adhering the electrode plate and the separator, wherein a density of adhesion portions of the plurality of adhesion portions in the first region is greater than a density of adhesion portions of the plurality of adhesion portions in the second region.

13. The secondary battery according to claim 1, further comprising:
a plurality of adhesion portions adhering the electrode plate and the separator, wherein the plurality of adhesion portions is provided asymmetrically with respect to the central region.

14. The secondary battery according to claim 1, wherein the electrode plate includes an active material layer,
the active material layer and the separator are adhered to each other in the first region and the second region, and
adhesion strength per unit area between the active material layer and the separator in the first region is higher than adhesion strength per unit area between the active material layer and the separator in the second region.

15. A method of manufacturing a secondary battery, the method comprising:
stacking an electrode plate and a separator on each other, the electrode plate including a main body portion and an electrode terminal portion protruding from the main body portion along a first direction; and
thermally adhering the electrode plate and the separator stacked on each other, wherein
the main body portion of the electrode plate includes
a central region including a center position of the main body portion in the first direction,
a first region closer to the electrode terminal portion than the central region in the first direction, and
a second region located on a side opposite to the first region with respect to the central region in the first direction,
adhesion strength per unit area between the electrode plate and the separator in the first region is higher than adhesion strength per unit area between the electrode plate and the separator in the second region,
in the thermally adhering, an amount of heat applied to the first region per unit area is larger than an amount of heat applied to the second region per unit area,
the central region is defined by
two peripheral edges of the main body portion opposite to each other in a second direction crossing the first direction,
a first boundary separating the central region from the first region and extending in the second direction between the two peripheral edges, and
a second boundary separating the central region from the second region and extending in the second direction between the two peripheral edges,
the first region is defined by
the two peripheral edges,
a first edge connecting the two peripheral edges, and
the first boundary, and
the second region is defined by
the two peripheral edges,
a second edge opposite to the first edge and connecting the two peripheral edges, and
the second boundary.

16. The method of manufacturing the secondary battery according to claim 15, wherein the thermally adhering includes heating the first region at a temperature higher than a temperature of heating the second region.

17. The method of manufacturing the secondary battery according to claim 15, wherein the thermally adhering includes heating the first region for a longer period of time than a period of time for heating the second region.

18. The method of manufacturing the secondary battery according to claim 15, wherein a positive electrode active material of the secondary battery includes lithium.

19. The method of manufacturing the secondary battery according to claim 15, wherein the thermally adhering includes heating the electrode terminal portion.

20. The method of manufacturing the secondary battery according to claim 19, wherein the thermally adhering includes pressing the electrode terminal portion while heating the electrode terminal portion.

* * * * *